United States Patent
Link et al.

(10) Patent No.: US 6,383,080 B1
(45) Date of Patent: May 7, 2002

(54) KIOSK FOR PRINTING AND COMMUNICATING VIDEO GAME IMAGES

(75) Inventors: Patrick J. Link, Carnation; Ben Ong, Seattle; Yoshinobo Mantani, Kirkland, all of WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/567,022

(22) Filed: May 9, 2000

(51) Int. Cl.[7] .................................................. A63F 9/24
(52) U.S. Cl. .......................................... 463/47; 463/30
(58) Field of Search .................................. 463/1, 30–31, 463/36, 44–47, 40–42, 25, 29; 273/148 B; 355/18–19; 348/460, 552

(56) References Cited

U.S. PATENT DOCUMENTS

| | | | |
|---|---|---|---|
| 4,095,791 A | * | 6/1978 | Smith et al. |
| 5,184,830 A | * | 2/1993 | Okada et al. |
| D443,623 S | * | 9/1999 | Ohno |
| 6,022,274 A | * | 2/2000 | Takeda et al. |
| 6,120,379 A | * | 9/2000 | Tanaka et al. |

\* cited by examiner

Primary Examiner—Mark Sager
(74) Attorney, Agent, or Firm—Nixon & Vanderhye P.C.

(57) ABSTRACT

A kiosk includes a game machine console having a processing system. The game machine has a connector that, in use, is connected to a cartridge comprising a memory. A video printer has a video input connected to a video output of the game machine console and a video output connected to a video input of a television. Control circuitry is connected to the game machine and to the video printer. The control circuitry is configured to enable a user to selectively print out images stored in the memory of the cartridge.

14 Claims, 5 Drawing Sheets

KIOSK FOR PRINTING AND COMMUNICATING VIDEO GAME IMAGES

TECHNICAL FIELD

The present invention generally relates to video game systems and, more particularly, to a kiosk (or station) for printing and communicating video game system images.

BACKGROUND AND SUMMARY OF THE INVENTION

Some video game systems provide users the capability of capturing images. For example, as described in U.S. patent application Ser. No. 09/430,169, filed Oct. 29, 1999, entitled "Portable Game Machine Having Image Capture, Manipulation and Incorporation", a digital camera cartridge may be used with a portable game machine. The digital camera cartridge includes a memory for storing one or more captured images. Certain video games also involve capturing images. One such game is Pokemon® Snap for the Nintendo 64® video game system. Players of the game proceed through various environments in a vehicle that travels through the air, in water and on land and try to "snap" the best pictures of various Pokemon® (pocket monster) characters. The player uses various techniques to get good pictures of the characters including using food and music to entice the characters into positions in which good pictures can be taken. The player has a limited number of exposures on his/her roll of film and may select certain ones of exposures for inclusion in an "album" stored in a read/write memory of the game cartridge. Using the game controller, a player can later review the pictures stored in his/her album on the television connected to the game console.

It would be desirable to provide a system and method for permitting players to compare, share and/or print out images.

In accordance with one aspect of the present invention, a kiosk includes a game machine console having a processing system. The game machine has a connector that, in use, is connected to a cartridge comprising a memory. A video printer has a video input connected to a video output of the game machine console and a video output connected to a video input of a television. Control circuitry is connected to the game machine and to the video printer. The control circuitry is configured to enable a user to selectively print out images stored in the memory of the replaceable memory cartridge.

In accordance with another aspect of the present invention, the kiosk also includes communication circuitry for communications over a communication network (e.g., the Internet, the public switched telephone network, a local area network, etc.). The communication circuitry is usable to selectively transmit images stored in the memory of a memory cartridge over the communication network. In this way, images may, for example, be electronically mailed (e-mailed) to others. Kiosk users may also submit images from their own memory cartridges to an on-line album maintained, for example, on a web server computer. Kiosk users may also view images submitted to the on-line album by others and/or selectively print out images from the on-line album. In the case of images captured during video game play, an on-line album can be used to build a gaming community of players having common interests and provides an opportunity for game players to compare the results of game playing with each other.

These and many other advantages of the present invention will be more completely understood and appreciated by careful study of the following more detailed description of illustrative embodiments of the invention taken in conjunction with the accompanying drawings.

DETAILED DESCRIPTION OF THE INVENTION

The present invention is described in the context of exemplary embodiments. However, the scope of the invention is not limited to the particular embodiments described in the specification. Rather, the description merely serves to illustrate the principles and characteristics of the present invention. Those skilled in the art will recognize that various modifications and refinements may be made without departing from the spirit and scope of the invention.

Figure 1:
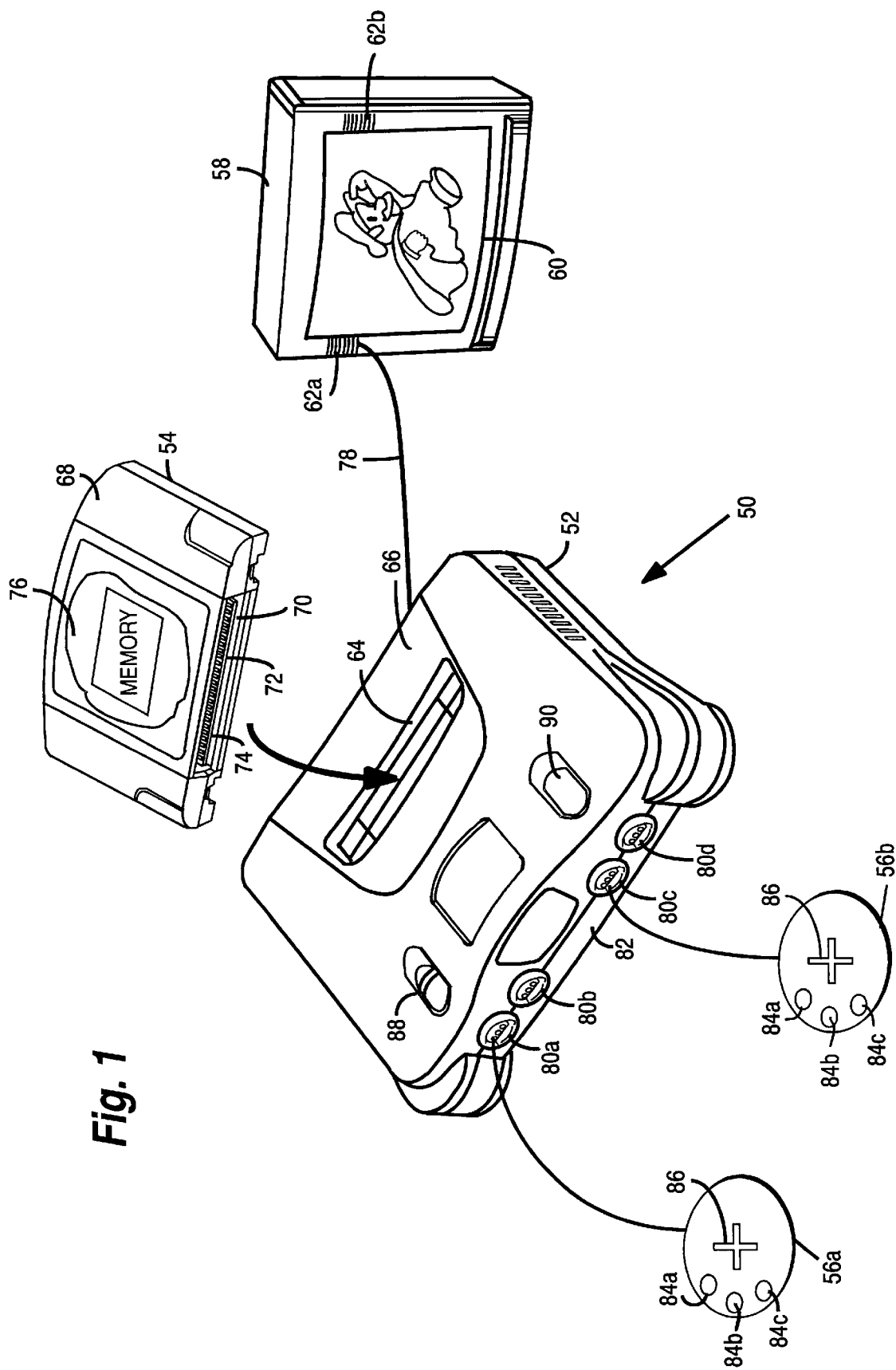
FIG. 1 shows a video game system.

FIG. 1 shows a video game system 50 that includes a main console 52, a video game storage device 54, and handheld controllers 56a and 56b (or other user input devices). Video game system 50 may be, for example, the Nintendo 64® video game system. Main console 52 is connected to a conventional home color television set 58. Television set 58 displays three-dimensional (3-D) video game images on its television screen 60 and reproduces stereo sound through its speakers 62a and 62b.

Video game storage device 54 is typically in the form of a replaceable memory cartridge insertable into a slot 64 on a top surface 66 of console 52. A wide variety of alternative program storage media such as CD ROMs, DVDs, floppy disks, and the like may be utilized. Video game storage device 54 may, for example, comprise a plastic housing 68 encasing a printed circuit board 70. Printed circuit board 70 has an edge 72 defining a number of electrical contacts 74. When the video game storage device 54 is inserted into main console slot 64, the cartridge electrical contacts 74 mate with corresponding "edge connector" electrical contacts within the main console. This action electrically connects the storage device printed circuit board 70 to the electronics within main console 52. At least a memory 76 is disposed on printed circuit board 70 within storage device housing 68. Memory 76 includes a read only memory (ROM) and a read/write memory (e.g., an EEPROM). The ROM stores instructions and other information pertaining to a particular video game. The ROM of a memory 76 for one game cartridge storage device 54 may, for example, contain instructions and other information for an adventure game while the ROM of a memory 76 of another storage device 54 may contain instructions and information to play a car race game, an educational game, etc. To play one game as opposed to another game, the user of video game system 50 need only plug the appropriate storage device 54 into main console slot 64—thereby connecting the storage device's memory 76 (and any other circuitry it may contain) to console 52. This enables a computer system embodied within console 52 to access the information contained within the ROM of memory 76, which information controls the console computer system to play the appropriate video game by displaying images and reproducing sound on color television set 58 as specified under control of the ROM game program information.

Data may be written to and read from the read/write memory of memory 76 by the computer system embodied within console 52. This data may include, but is not limited to, game scores and game levels. As will be explained in greater detail below, when the game instructions contained within the ROM of memory 76 enable players to "snap" pictures to capture images of game characters and/or game scenes, these images may also be stored in the read/write memory of memory 76.

The user may connect up to four controllers to corresponding connectors (sockets) 80a–80d on main unit front panel 82. Two controllers 56a and 56b are shown in FIG. 1. Controllers 56a and 56b may take a variety of forms. For example, each of controllers 56a and 56b shown in FIG. 1 include various function controlling push buttons such as 84a–c and an X-Y switch 86 used, for example, to specify the direction (up, down, left or right) that a player-controllable character displayed on television screen 60 should move. Other controller possibilities include joysticks, mice pointer controls and a wide range of other conventional user input devices.

In use, a user selects a storage device 54 containing a desired video game, and inserts that storage device into console slot 64 (thereby electrically connecting memory 76 and other cartridge electronics to the main console electronics). The user then operates a power switch 88 to turn on the video game system 50 and operates controllers 56a and/or 56b to provide inputs to console 52 and thus control video game play. For example, depressing one of push buttons 84a–c may cause the game to start playing. Moving directional switch 86 may cause animated characters to move on the television screen 60 in controllably different directions. Depending upon the particular video game stored within the storage device 54, these various controls 84a–c and 86 on the controllers 56a and 56b can perform different functions at different times. If the user wants to restart game play from the beginning, or alternatively with certain game programs reset the game to a known continuation point, the user can press a reset button 90.

Additional details of game system 50 may be found in U.S. Pat. No. 6,022,274 the contents of which are incorporated herein.

As noted above, some video games involve capturing images. One such game is Pokemon® Snap. To play the Pokemon® Snap game, a user selects a storage device 54 containing the game, and inserts that storage device into console slot 64 (thereby electrically connecting memory 76 and other cartridge electronics to the main console electronics). The user then operates power switch 88 to turn on video game system 50. By appropriate operation of controllers 56a and/or 56b, a player of the Pokemon® Snap game proceeds through various environments in a vehicle that travels through the air, in water and on land and try to "snap" pictures of various characters. Certain ones of the captured images may be selected for inclusion in an "album" stored in the read/write memory of memory 76 of game cartridge 54.

Figure 2:
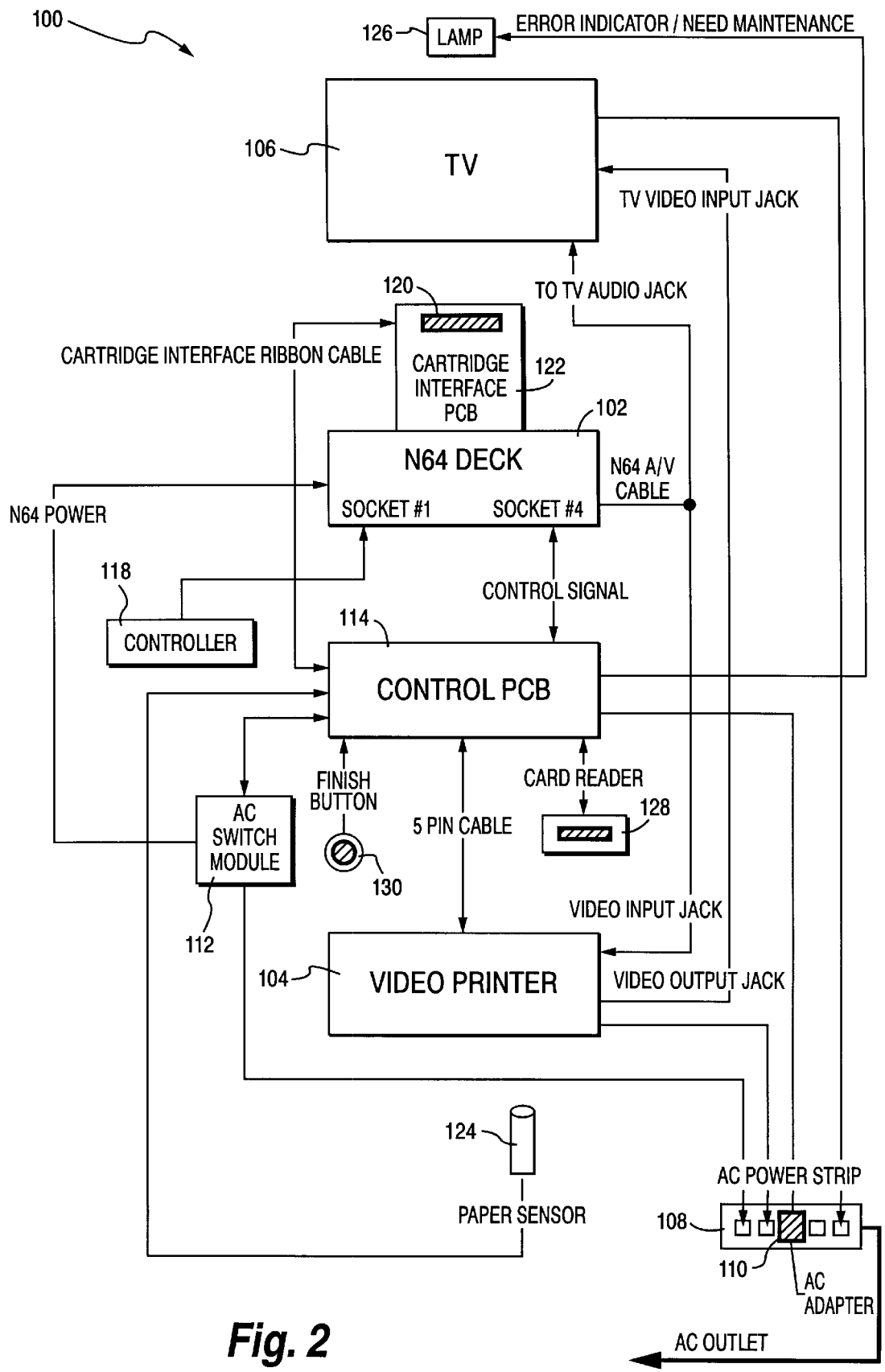
FIG. 2 is a system wiring diagram for a kiosk for printing video game system images in accordance with one embodiment of the present invention.

FIG. 2 is a system wiring diagram for a kiosk 100 in accordance with the present invention. Kiosk 100 is typically located in a publicly accessible location such as a store, a mall, an arcade, a building lobby, and the like. Kiosk 100 includes a game console (or "deck") 102 like the game console described above with reference to FIG. 1. A user may electrically connect a game cartridge containing stored images to game console 102 contained within kiosk 100. The read/write memory of the user's game cartridge may, for example, contain images of characters and/or scenes captured (or "snapped") during game play on the user's home game console. Kiosk 100 contains a video printer 104 that permits the user to print out selected ones of the images stored in the read/write memory of the game cartridge. In an additional embodiment to be described below, kiosk 100 includes communication circuitry that permits the user to transmit selected ones of the images stored in the game cartridge to others and/or to upload selected ones of the images to an on-line album.

Console 102 of kiosk 100 is coupled to a color television 106 via video printer 104. Console 102 produces both "video" signals and "audio" signals for output to color television 106. The "video" signals control the images displayed on the screen of television 106 and the "audio" signals are played back as sound through the speaker(s) of television 106. The audio signals are supplied from console 102 to an audio jack of television 106. The video signals are supplied from console 102 to a video input of video printer 104. A video output jack of video printer 104 is connected to a video input jack of television 106. In modes other than print mode, video printer 104 acts as a "pass-through" to television 106 for the video signals output by console 102. Depending on the type of television 106, it might be necessary to connect a conventional "RF modulator" in the signal path between the video output of console 102 and the video input jack of television 106 (e.g., between the video output jack of video printer 104 and the video input jack of television 106). This "RF modulator" converts the direct video and audio outputs of console 102 into a broadcast type television signal (e.g., for a television channel 3 or 4) that can be received and processed using the television set's internal "tuner." Other conventional color televisions 106 have direct video and audio input jacks and therefore do not require this intermediate RF modulator. Video printer 104 is a conventional video printer such as the Panasonic NT-300 (a 306 dpi dye sublimation video printer) that prints out onto a printing medium an image (or images) corresponding to video signals supplied to its video input jack.

Various components of kiosk 100 are plugged into an AC power strip 108 which itself is plugged into a standard electrical wall socket (not shown). Power strip 108 may include an AC adapter 110 that converts the socket voltage into a lower voltage DC signal suitable for powering certain ones of the kiosk components. An AC switch module 112 is responsive to a switch control signal from a control printed circuit board (PCB) 114 for selectively supplying power to console 102. Switch module 112 briefly interrupts power to console 102 for the purpose of resetting the game. In kiosk 100, PCB 114 switches power to an electromechanical relay located in switch module 112. This relay is energized for a brief period (e.g., about 1 second), causing the power line voltage to be removed from and then reapplied to console 102. This causes the game being executed by console 102 to restart from the beginning.

The resetting of the console is performed under two circumstances. First, switching between the normal "play" mode of the game program executed by console 102 and the "print" mode requires that the game be restarted. The game enters print mode if controller communication activity is detected on (controller) socket 4 of console 102 within the first few seconds after the game is started. Socket 4 is connected to control PCB 114, which provides the communication activity only if the particular restart is for the purpose of entering the print mode. If the restart is not for the purpose of printing, socket 4 communication activity is delayed for about five seconds. This causes the game to start in a normal operating mode. Socket 4 communication becomes available after about five seconds so that control PCB 114 can be informed when, for example, a "Print" button is pressed in a game.

Second, it is desirable, when kiosk 100 is installed in a retail location, to limit the amount of time that a user can use kiosk 100. When console 102 is operating in the normal game play mode, control PCB 114 restarts the console 102 periodically, thus discouraging users from using kiosk 100 for long periods of time. The amount of time between restarts is configurable, for example, using switches on control PCB 114. A switch setting may also be provided to disable the restart timer.

Control PCB 114 controls the overall operation of kiosk 100. Control PCB 114 includes a microcontroller (Microchip 16C65), a Nintendo N64® controller IC (the same as found in the standard consumer controller), a one digit LED display for displaying a number of print credits available, a first indicator LED for indicating a card error, a second indicator LED for indicating a printer problem, and connectors for interfacing to socket 4 of console 102, to switch module 112, to cartridge interface PCB 122, to paper sensor 124, to card reader 128, to problem lamp 126, and to Finish button 130. The microcontroller of control PCB 114 is a one-time programmable device that is programmed with code used for general operation of kiosk 100.

Cartridge interface PCB 122 allows an external control signal (supplied by control PCB 114) to select one of two different cartridges to be connected to console 102: an internal game cartridge contained within kiosk 100 or a game cartridge inserted into game cartridge slot 120 by a user. Cartridge interface PCB 122 includes analog switches (HC4053) that can route address, data and control signals between a game cartridge connector and either the internal game cartridge or the user-inserted game cartridge. The signal that controls the analog switches is transmitted via the cartridge ribbon interface cable. The cartridge ribbon cable also includes a line that is pulled low when the user inserts a cartridge into game cartridge slot 120. This informs control PCB 114 that console 102 should be powered off, switched to the user-inserted cartridge, and then restarted. The cartridge ribbon cable also includes a video sync signal from console 102. Control PCB 114 uses the video sync signal to verify that the game has started successfully.

A printing medium sensor 124 is coupled to control PCB 114. Sensor 124 is used to detect an "out-of-printing medium" condition when no more printing medium is available to print out images. In response to detection of this condition, control PCB 114 may, for example, cause indicator lamp 126 and/or the second indicator LED to be illuminated. Lamp 126 may also be illuminated to indicate that other system errors have occurred and/or to indicate that system maintenance is required.

Control PCB 114 is also connected to an authorization device 128 for use in determining whether a user can print out stored images either from the game cartridge inserted in connector slot 120 or from the internal game cartridge. Authorization device 128 may, for example, comprise a card reader that accepts cards encoded with "credit" usable for printing out images. A user inserts his/her "credit" card into the card reader. As will be described in greater detail below, control PCB 114 determines whether there is sufficient credit on the card to enable the user to print out images and, if so, the user may proceed to print out selected images.

The one digit LED display of control PCB 114 is used to convey credit information. For example, if the "credit" card is encoded with one credit, the display shows a "1" if a card containing a credit is inserted into card reader 128. Once a print is made, the credit is deducted from the card and the display shows "0" for that card, indicating that the card can no longer be used to make prints. Card errors detected by control PCB 114 may be are indicated by illuminating the first indicator LED.

Thus, in one simple implementation, a card may be encoded with a credit bit stored in a nonvolatile read/write memory (e.g., an EEPROM) that may be set equal to "1" or to "0". If control PCB 114 determines that a card with a credit bit equal to "1" is inserted into the card reader, the printing of images may proceed. Control PCB 114 then changes the credit bit to "0". With the credit bit set equal to "0", the card cannot be used to print out images using kiosk 100. To enable the reusability of the cards, "credit" kiosks (not shown) may be provided at which the user inserts the card into a card reader and inserts money into a bill acceptor or a coin acceptor. When an appropriate amount of money has been inserted, the credit kiosk is configured to change the credit bit in the non-volatile read/write memory from "0" to "1". The user can then take the card and use it in kiosk 100 to print out images.

Of course, authorization device 128 is not limited to implementation as a card reader. For example, authorization device 128 may comprise a bill acceptor into which a user inserts bills until an amount sufficient to pay for printing out selected images has been inserted. In still another implementation, authorization device 128 may comprise a coin acceptor into which a user inserts coins until an amount sufficient to pay for printing out selected images has been inserted. Other implementations using bank credit cards, charge cards, debit cards, check cards, cards with magnetic strips, etc. are also contemplated.

Kiosk 100 may be used to print out images selected from among images stored in the read/write memory of a user's own game cartridge as a result of game play. In this case, the user inserts his/her game cartridge into connector slot 120 and images stored in the memory of the inserted game cartridge may be printed out. Alternatively, kiosk 100 may be used to print out images selected from among images pre-stored in the internal game cartridge. The provision of pre-stored images in an internal game cartridge permits kiosk 100 to be used by users that do not have their own game cartridge with images captured as a result of game play. It is of course also possible that kiosk 100 may be used print out some images selected from among the images stored in the read/write memory of a user's own game cartridge and other images selected from among the images pre-stored in the internal game cartridge.

The print operation is invoked by selecting a "Print" button within the game being played using kiosk 100. If a card with credit is inserted at this time, console 102 is restarted and begins to draw the images to be printed on the television screen. After the images have been drawn and captured by video printer 104, control PCB 114, which handles the synchronizing communication between console 102 and video printer 104, attempts to deduct a credit from the card inserted in card reader 128. If successful, the "Print" command is sent to video printer 104 and printing commences.

Finish button 130 is pressed when the user wishes to remove a cartridge from game cartridge slot 120. Pressing the button removes power from the cartridge connector, which is a recommended condition for insertion or removal of a game cartridge from console 102. Because there is no mechanical method of capturing the cartridge, the cartridge can in fact be removed without pressing Finish button 130 (i.e., while the user's game is still running on console 102). Whether or not Finish button 130 is pressed, kiosk 100 restarts, running the internal game cartridge, when the user removes his/her cartridge.

Figure 3A:
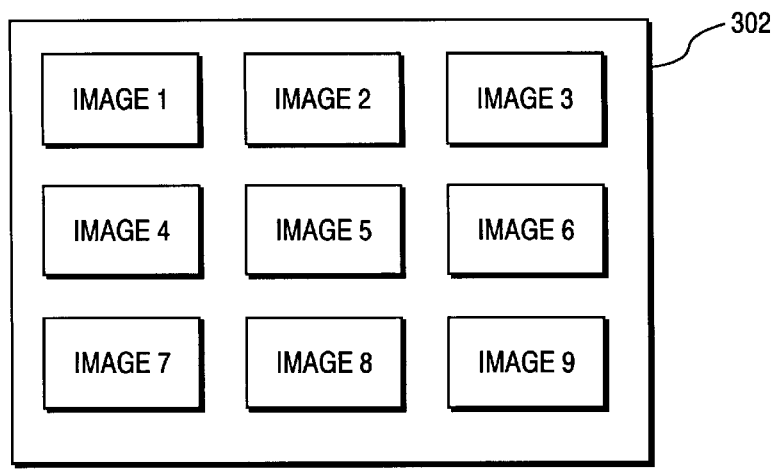
FIG. 3A is a schematic representation of an album of video game images.
Figure 3B:
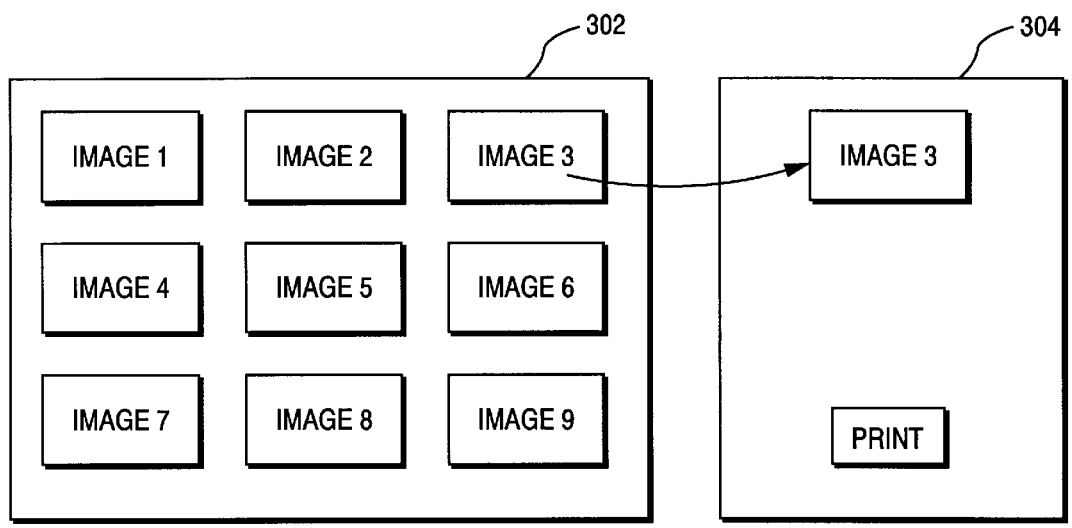
FIG. 3B is a schematic illustration of "dragging-and-dropping" selected video game images in a Gallery for printing out.

The user selects images from among the images in an album 302 arranged, for example, as schematically shown in FIG. 3A and displayed on television 106. Images for printing may be selected in various manners and the invention is not limited in this respect. For example, a user may click (or double-click) on one or more images from album 302 using a button or key of game controller 118. Alternatively, a user may "drag and drop" one or more images from album 302 to a Gallery 304 as schematically suggested in FIG. 3B. The user may also drag and drop images within Gallery 304 to thereby arrange the images in a user-desired order.

The printing medium may take many forms and the present invention is not limited in this respect. In one implementation, the printing medium is photographic quality paper to provide high quality print outs of the selected images. In another implementation, the photographic quality paper may be in the form of stickers that can be removed from the backing of the paper. The stickers are provided with an adhesive so that they may be attached (preferably removably attached) to display surfaces.

Figure 4:
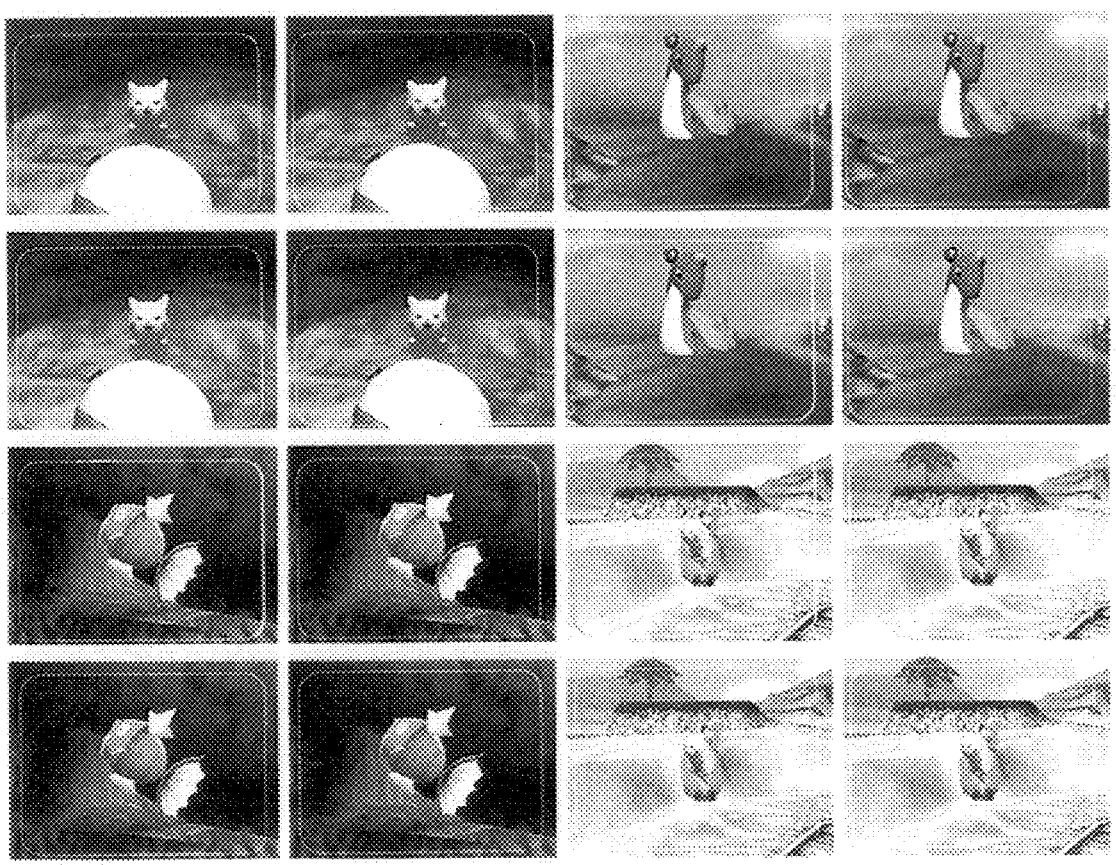
FIG. 4 illustrates an exemplary print-out from video printer 104.

The user generally chooses a plurality of images to compose Gallery 304. For example, in one game, the user may choose four images A, B, C and D to compose Gallery 304. The four images may be printed as sixteen stickers as suggested below, resulting in four stickers of each image in Gallery 304. See also FIG. 4.

| A | B | --> | A | A | B | B |
|---|---|-----|---|---|---|---|
| C | D |     | A | A | B | B |
|   |   |     | C | C | D | D |
|   |   |     | C | C | D | D |

In another game, the user may be allowed to compose a Gallery of sixteen images, allowing the printing of sixteen different stickers at a time. Of course, the present invention is not limited to any particular number of printed images. When the user has finished selecting the images for print out, he/she presses an on-television screen "Print" button to initiate the printing operation.

The printing operation is summarized as follows:
(1) The user arranges images in the Gallery as desired.
(2) The user presses a "Print" button on the Gallery screen. The game sends a Print Request to control PCB 114 via socket 4.
(3) If a card with credit is present, control PCB 114 restarts console 102, enabling socket 4 communication immediately.
(4) The game starts in print mode, and printer initialization commands are sent to control PCB 114 via socket 4.
(5) Control PCB 114 sends initialization commands (16-sticker mode, etc.) to video printer 104 via, for example, a five pin cable.
(6) The game draws the image for first sticker on the screen of television 106 and sends a Capture command to printer 104 via control PCB 114. This step is repeated for each of the 16 images (even if the images are duplicated).
(7) Control PCB 114 deducts credit from card. If this fails for any reason (no card, no credit, etc.), the game is restarted in normal operating mode and the captured images are discarded.
(8) Control PCB 114 sends a Print command to video printer 104.
(9) Upon completion of printing, control PCB 114 restarts console 102, delaying socket 4 communication for 5 seconds so that the game starts in normal mode.

Figure 5:
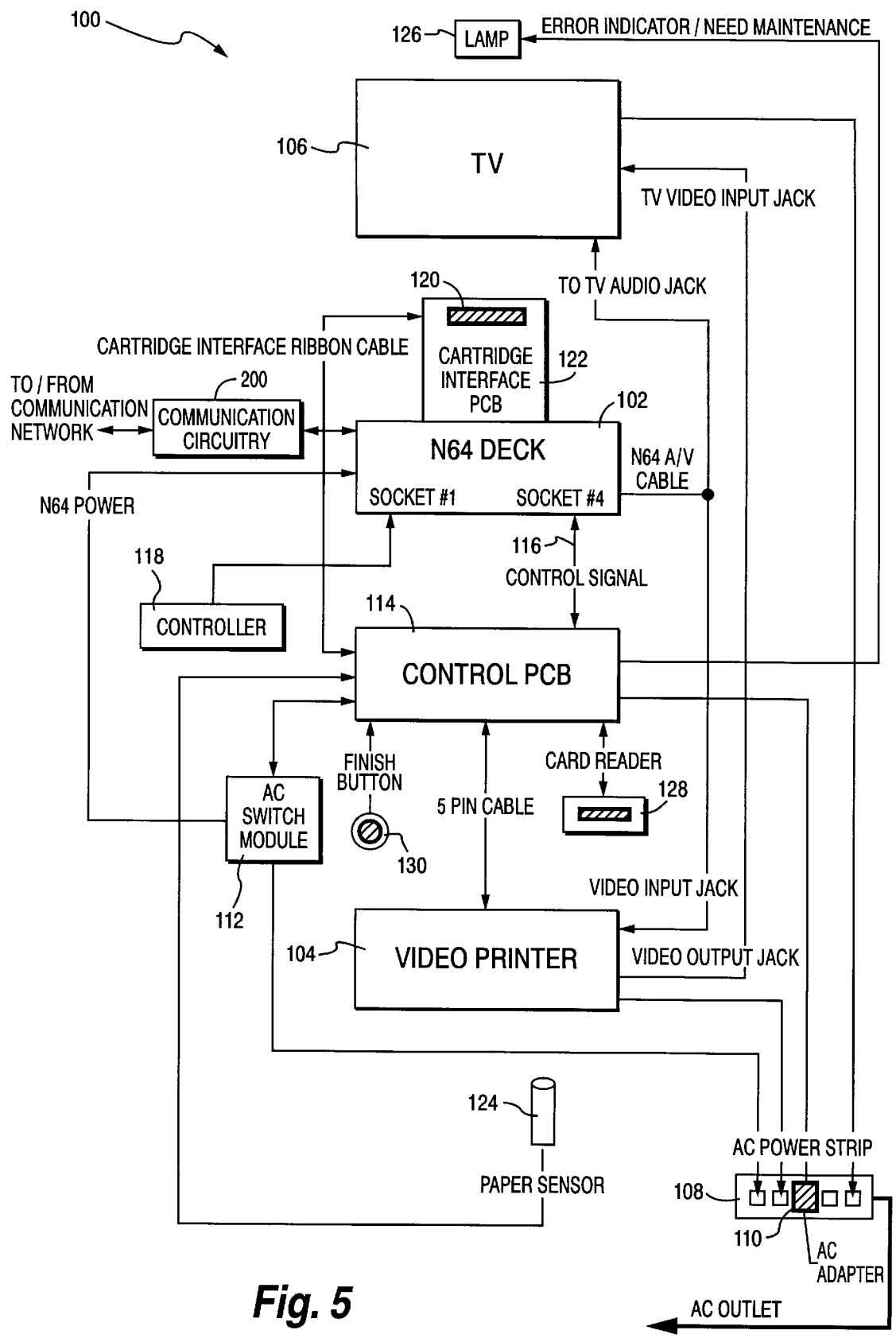
FIG. 5 is a system wiring diagram for a kiosk for printing and communicating video game system images in accordance with another embodiment of the present invention.

In accordance with another aspect of the present invention, kiosk 100 may be provided with communication circuitry 200 (see FIG. 5) for enabling communications (transmitting and receiving) over a communication network (e.g., the Internet, the public switched telephone network, a local area network, etc.) to remote web servers and remote personal computers. Communication circuitry 200 may, for example, comprise a modem or network interface circuitry and is usable, for example, to transmit selected images over the communication network. This communication feature may be invoked from within a game being played using console 102. In this way, images may be electronically mailed (e-mailed) to others. The e-mail address(es) of the recipient(s) may be entered using game controller 118 (e.g., by inputting character selections from a keypad displayed on television 106). It is also contemplated that e-mail addresses could be selected from among e-mail addresses stored in the read/write memory of the user's game cartridge inserted in slot 120 or from among e-mail addresses stored on a memory card inserted in a memory card reader connected to control PCB 114. The memory card reader may be the same as or different from the card reader for authorization device 128. The user may include user identification information within the e-mail to identify the user as the sender of the e-mail. Other information may be included in the e-mail. For example, if the kiosk is located in a store, the e-mail may contain identification information identifying the store by name, address, etc. Promotional information regarding the store, products available in the store, etc. may also be included.

Users of the kiosk may also submit images from the read/write memory of their game cartridges to an on-line album maintained, for example, on a web server computer. This on-line album may be a personal album, a public album or an album to which access is limited to certain members of a user-defined group. In the case of images of characters captured from a video game, the album (or albums) on the web server may be organized on the basis of the characters' identities such that one section of the album contains various images of one character, another section of the album contains various images of another character, etc. Access to the albums or certain portions of the albums may be password-controlled. The images submitted to the on-line album may be accompanied by identification information identifying the user making the submission. This identification information may be shown as captions for the images in the on-line album. The images submitted to the on-line album may also be accompanied by identification information that identifies the kiosk from the images were uploaded. For example, this identification information may be the name and address of the store or mall in which the kiosk is located.

Users of the kiosk may also be provided with the capability of accessing the on-line album of images to view images submitted by others and/or to selectively print out images submitted by others by placing such images in their print-out Galleries. In the case of images captured during video game play, the on-line album can be used to build a gaming community of players having common interests and provides an opportunity for game players to compare the results of game playing with each other and trade images with one another. The on-line album may also provide the basis for regional, national and even world-wide contests in which prizes are awarded based on the quality of submitted images, the content of the images, etc.

It will apparent that access to and use of the on-line album features are not limited to access via a kiosk. The access to and use of the on-line album may be via any internet-enabled computing device.

It will also be apparent that the housing in which the components of kiosk 100 are contained is not limited to any particular configuration and may be based on, among other things, the location of the kiosk. The housing is preferably configured to provide an opening through which television 106 may be viewed and openings to provide appropriate user accessibility (e.g., user accessibility to game cartridge slot 120, card reader 128, Finish button 130 and the output of video printer 104). Controller 118 should also be easily accessible to and usable by the user.

The above description is given in terms of a video game in which images are captured during game play. However, the kiosk of the present invention is not limited in this respect. For example, as described in U.S. application Ser. No. 09/430,169, a digital camera cartridge may be used with a portable game machine. The digital camera cartridge includes a memory for storing one or more captured images. The above-described kiosks may be readily applied to printing out and communicating images captured using a digital camera cartridge.

The contents of any patent documents referred to in this patent application are hereby incorporated herein in their entirety.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

We claim:

1. A kiosk comprising:

a game machine console having a processing system, said game machine having an interface that, in use, electrically connects a cartridge comprising a memory to said processing system;

a video printer having a video input connected to a video output of said game machine console and a video output connected to a video input of a television; and control circuitry connected to said game machine console and to said video printer, said control circuitry being configured to enable a user to selectively print out images stored in the memory of said cartridge during a print mode that is initiated by restarting said game machine console and supplying a print mode signal to an input of said game machine console during the restarting.

2. The kiosk according to claim 1, wherein the interface of said game machine console selectively connects one of two different cartridges to said processing system of said game machine console.

3. The kiosk according to claim 1, wherein said control circuitry is configured to enable said processing system of said game console to execute a game program stored in said cartridge.

4. The kiosk according to claim 3, further comprising:

player controls operable by a user to generate control signals for the game program.

5. The kiosk according to claim 1, wherein an audio output of said game console is connected to an audio input of said television.

6. The kiosk according to claim 1, further comprising:

an authorization device connected to said control circuit, said control circuit using authorization data from said authorization device to determine whether a user can selectively print out images stored in said memory of said cartridge.

7. The kiosk according to claim 6, wherein said authorization device is a coin box and the authorization data allowing a user to print out images is generated when coins of a predetermined value are inserted in said coin box.

8. The kiosk according to claim 6, wherein said authorization device is a bill reader and the authorization data allowing a user to print out images is generated when bills of a predetermined value are inserted in said bill reader.

9. The kiosk according to claim 6, wherein said authorization device is a card reader configured to read credit data from a card inserted therein and the authorization data allowing a user to print out images is generated when the card inserted in said card reader contains at least a predetermined credit amount.

10. The kiosk according to claim 1, further comprising:

communication circuitry for communicating a selected one or more of the images stored in the memory of said cartridge over a communication network.

11. The kiosk according to claim 10, wherein said communication circuitry communicates data identifying said kisok over the communication network along with the selected image or images.

12. The kiosk according to claim 10, wherein the communication network is the Internet.

13. The kiosk according to claim 1, further comprising:

an internal cartridge for pre-storing images, wherein said control circuitry is further configured to enable a user to selectively print out pre-stored images stored in said internal cartridge.

14. The kiosk according to claim 1, wherein said game machine console is restarted by interrupting power supplied thereto.

* * * * *